(12) United States Patent
Su et al.

(10) Patent No.: US 8,228,295 B2
(45) Date of Patent: Jul. 24, 2012

(54) WIRELESS MOUSE CHARGEABLE BY A COMPUTER SYSTEM

(75) Inventors: Chun-Nan Su, Taipei (TW); Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 483 days.

(21) Appl. No.: 12/407,696

(22) Filed: Mar. 19, 2009

(65) Prior Publication Data

US 2010/0182237 A1    Jul. 22, 2010

(30) Foreign Application Priority Data

Jan. 16, 2009  (TW) ............................... 98101489 A

(51) Int. Cl.
    *G06F 3/033*    (2006.01)
(52) U.S. Cl. ........................................... 345/163
(58) Field of Classification Search ............... 345/163
    See application file for complete search history.

(56) References Cited

U.S. PATENT DOCUMENTS

| | | | |
|---|---|---|---|
| 2002/0024502 A1* | 2/2002 | Iwasaki ......................... | 345/163 |
| 2003/0160762 A1* | 8/2003 | Lu ................................. | 345/163 |
| 2004/0142600 A1* | 7/2004 | Metz .............................. | 439/638 |
| 2004/0252106 A1* | 12/2004 | Koh .............................. | 345/163 |
| 2006/0192757 A1* | 8/2006 | Chen ............................. | 345/163 |
| 2006/0250362 A1* | 11/2006 | Chung ........................... | 345/163 |
| 2007/0072443 A1* | 3/2007 | Rohrbach et al. ............... | 439/39 |
| 2007/0268253 A1* | 11/2007 | Chang ........................... | 345/163 |
| 2008/0030469 A1* | 2/2008 | Yen et al. ....................... | 345/163 |
| 2008/0218477 A1* | 9/2008 | Kuan ............................. | 345/163 |
| 2009/0174659 A1* | 7/2009 | Chiang et al. .................. | 345/163 |
| 2010/0090661 A1* | 4/2010 | Chen et al. ..................... | 320/157 |

* cited by examiner

*Primary Examiner* — Joseph Haley
*Assistant Examiner* — Mark Fischer
(74) *Attorney, Agent, or Firm* — Kirton McConkie; Evan R. Witt

(57) ABSTRACT

A chargeable wireless mouse includes a mouse body, a battery, a charging slot and a wireless signal receiver. A magnetic element and a conducting member are disposed within the charging slot. The wireless signal receiver includes a USB connecting part, a metallic plate and a charging plate. The wireless signal receiver is connected with a computer host via a USB connecting port. When the wireless signal receiver is accommodated within the charging slot, the metallic plate is magnetically attracted by the magnetic element such that the wireless signal receiver is fixed in the charging slot. At the same time, the charging plate is contacted with the conducting member such that electricity is transmitted from the receiver circuit board to the chargeable battery.

11 Claims, 4 Drawing Sheets

WIRELESS MOUSE CHARGEABLE BY A COMPUTER SYSTEM

FIELD OF THE INVENTION

The present invention relates to a wireless mouse, and more particularly to a chargeable wireless mouse.

BACKGROUND OF THE INVENTION

With increasing development of scientific technologies, multimedia products and computers become essential in our daily lives. In the computer systems, input devices play important roles for communicating the computer and the user. The common input devices of the computer systems are for example mice, keyboards or trackballs. Among these input devices, mice are the most prevailing because they are very easy-to-use. When a mouse is held on the palm of the user's hand, the user may move the mouse to control movement of the cursor shown on the computer screen. In addition, by operating the click buttons of the mouse device, the user may select a desired item on the function menu of the browsing frame or execute a corresponding function.

Conventionally, a mouse is communicated with a computer via wire linkage. The wire linkage is very troublesome and inconvenient. Instead of using the connecting wire, a corresponding wireless signal receiver is used for receiving wireless signals issued from the mouse body when the wireless mouse is operated. Since no additional connecting wire is required to connect the wireless mouse with the computer, the application of the wireless mouse is no longer restricted by the connecting wire. In other words, the use of the wireless mouse is more convenient. In addition to the wireless mouse, other wireless peripheral devices such as wireless earphones, wireless keyboards and the like are communicated with the computer according to a wireless transmission technology. Among these wireless peripheral devices, the wireless mouse is very popular.

Although the wireless mouse has no spatial restriction because no signal wire is required, there are still some drawbacks. For example, when the wireless mouse is operated, the electric energy supply system becomes more important because no power can be supplied to the wireless mouse through a connecting port of the computer. Therefore, the wireless mouse usually has a built-in electric energy storage element such as a battery or a reusable and chargeable battery.

Hereinafter, a method of charging a wireless mouse will be illustrated with reference to FIG. 1. FIG. 1 is a schematic perspective view illustrating a computer system having a function of charging a wireless mouse according to the prior art. As shown in FIG. 1, the computer system 1 includes a computer host 10, a wireless mouse 11, a wireless signal receiver 12 and a wireless mouse charger 13. The computer host 10 has a universal serial bus (USB) connecting port (not shown). The wireless mouse 11 has a chargeable battery 111. The wireless signal receiver 12 may be inserted into the USB connecting port for receiving a wireless signal that is emitted by the wireless mouse 11. As such, the wireless mouse 11 is normally operated. Moreover, the wireless mouse charger 13 has a charging slot 131 for accommodating the wireless mouse 11. Several charging contacts 132 are formed in the charging slot 131. For charging the chargeable battery 111 of the wireless mouse 11, the wireless mouse 11 is accommodated in the charging slot 131 such that the charging contacts 132 of the wireless mouse charger 13 are in contact with corresponding charging contacts (not shown) of the wireless mouse 11. Meanwhile, electrical energy may be transmitted from the wireless mouse 3 charger 13 to the wireless mouse 11 in order to charge the chargeable battery 111 of the wireless mouse 11. Furthermore, as shown in FIG. 1, the wireless mouse charger 13 has a receiver storing part 133 for storing the wireless signal receiver 12.

There are two power sources for providing electricity to the wireless mouse charger 13. The first power source is a utility power source. As shown in FIG. 1, when the wireless mouse charger 13 is connected with a DC converter 134 through a DC converter connector 1341 and the DC converter 134 is connected to a utility power source (not shown), electricity will be transmitted from the utility power source to the wireless mouse charger 13. The second power source is the computer host 10. By inserting a USB connecting wire 135 into a USB connecting port of the computer host 10, electricity will be transmitted from the computer host 10 to the wireless mouse charger 13.

Although the method of charging the wireless mouse is very convenient, there are still some drawbacks. For example, it is necessary to carry the wireless mouse charger 13 for charging the chargeable battery 111 of the wireless mouse 11. In a case that this wireless mouse is used in other places, the user should carry the DC converter 134 or the USB connecting wire 135 at the same time. If the user forgets to carry the wireless mouse charger 13 and the DC converter 134 or the USB connecting wire 135, the charging operation fails to be done. That is, since the wireless mouse charger 13 is separated from the wireless mouse 11, the probability of forgetting to carry the wireless mouse charger 13 is increased and the need to carry the wireless mouse charger 13 is troublesome.

Therefore, there is a need of providing an improved chargeable wireless mouse so as to obviate the drawbacks encountered from the prior art.

SUMMARY OF THE INVENTION

It is an object of the present invention to provide a chargeable wireless mouse.

Another object of the present invention provides a chargeable wireless mouse that is connectable to and attachable onto a computer host.

In accordance with an aspect of the present invention, there is provided a chargeable wireless mouse. The chargeable wireless mouse includes a mouse body, a main circuit board, a chargeable battery, a charging slot, and a wireless signal receiver. The mouse body has a first surface and a second surface. The first surface and the second surface are perpendicular to each other. The area of the first surface is greater than that of the second surface. The main circuit board is disposed within the mouse body. The chargeable battery is disposed within the mouse body and connected to the main circuit board for storing electric energy. The charging slot is formed in the first surface. A first magnetic element and a conducting member are disposed within the charging slot. The conducting member is connected to the main circuit board. The wireless signal receiver is connected to a USB connecting port of a computer host for receiving a wireless signal emitted by the wireless mouse. The wireless signal receiver includes a holding part, a receiver circuit board, a USB connecting part, a metallic plate and a charging plate. The receiver circuit board is disposed within the holding part. The USB connecting part is disposed at a first end of the holding part to be connected with the USB connecting port of the computer host, wherein electricity of the computer host is transmitted to the receiver circuit board through the USB connecting part. The metallic plate is disposed at a second end of the holding part. The charging plate member is mounted on the receiver circuit board and exposed outside the holding part. When the wireless signal receiver is accommodated within the charging slot and the USB connecting part of the wireless signal receiver is connected with the USB connecting port of a computer host. In addition, the wireless signal receiver is contacted with the conducting member such that electricity is transmitted from the receiver circuit board to the chargeable battery. The metallic plate is contacted with and magnetically attracted by the first magnetic element such that the wireless signal receiver is fixed in the charging slot. The wireless signal receiver is perpendicular to the first surface of the mouse body.

In an embodiment, the first surface is a bottom surface of the wireless mouse and the second surface is a sidewall surface of the wireless mouse.

In an embodiment, the main circuit board has a charging circuit for controlling transmission of the electricity from the main circuit board to the chargeable battery.

In an embodiment, the wireless signal receiver further includes a second magnetic element, which is disposed on the metallic plate, for facilitating the metallic plate to be magnetically attracted by the first magnetic element.

In an embodiment, the first magnetic element and the second magnetic element are magnets.

In an embodiment, the conducting member includes a positive electrode conducting part and a negative electrode conducting part. The charging plate member includes a positive electrode charging plate and a negative electrode charging plate. When the wireless signal receiver is inserted into the charging slot, the positive electrode conducting part and the negative electrode conducting part are respectively contacted with the positive electrode charging plate and a negative electrode charging plate so as to transmit electricity.

In an embodiment, the mouse body further includes a charging slot cover for sheltering the charging slot. The charging slot is exposed when the charging slot cover is opened.

In an embodiment, the conducting member is a charger spring.

In an embodiment, a receiver storing part is further formed in the mouse body for storing the wireless signal receiver.

In an embodiment, the chargeable wireless mouse is a slim-type wireless mouse.

In an embodiment, the chargeable wireless mouse is a shape-changeable mouse.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
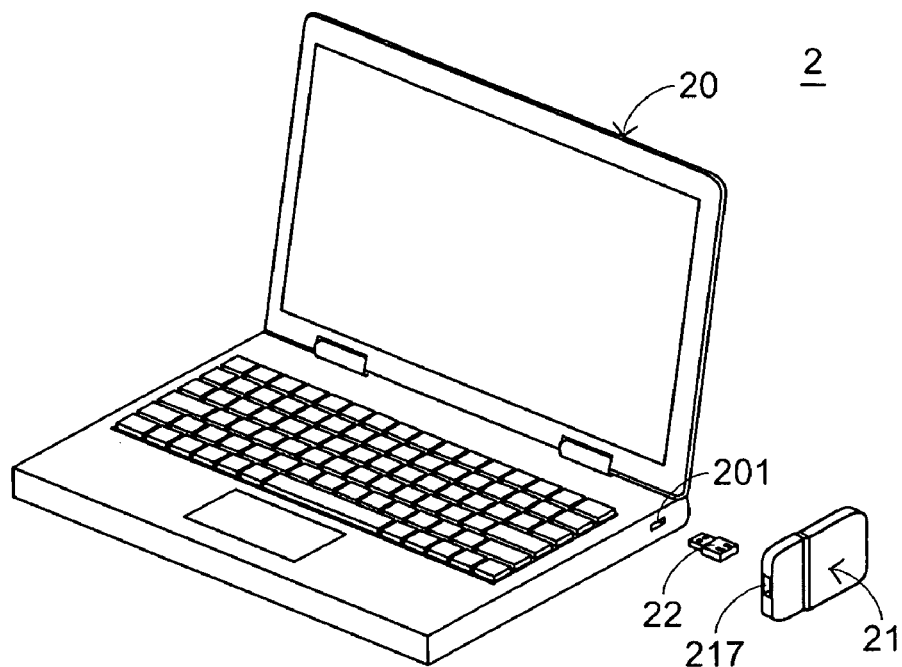
FIG. 2 is a schematic perspective view illustrating a computer system having a function of charging a wireless mouse according to a preferred embodiment of the present invention.

FIG. 2 is a schematic perspective view illustrating a computer system having a function of charging a wireless mouse according to a preferred embodiment of the present invention. As shown in FIG. 2, the computer system 2 includes a computer host 20 and a wireless mouse 21. The computer host 20 has a USB connecting port 201. The wireless mouse 21 can emit a wireless signal. The wireless mouse 21 includes a wireless signal receiver 22 and a receiver storing part 217. The receiver storing part 217 is arranged at an edge of the wireless mouse 21 for storing the wireless signal receiver 22. After the wireless signal receiver 22 is inserted into the USB connecting port 201 of the computer host 20, the wireless signal can be received by the wireless signal receiver 22 and then transmitted to the computer host 20.

Figure 3:
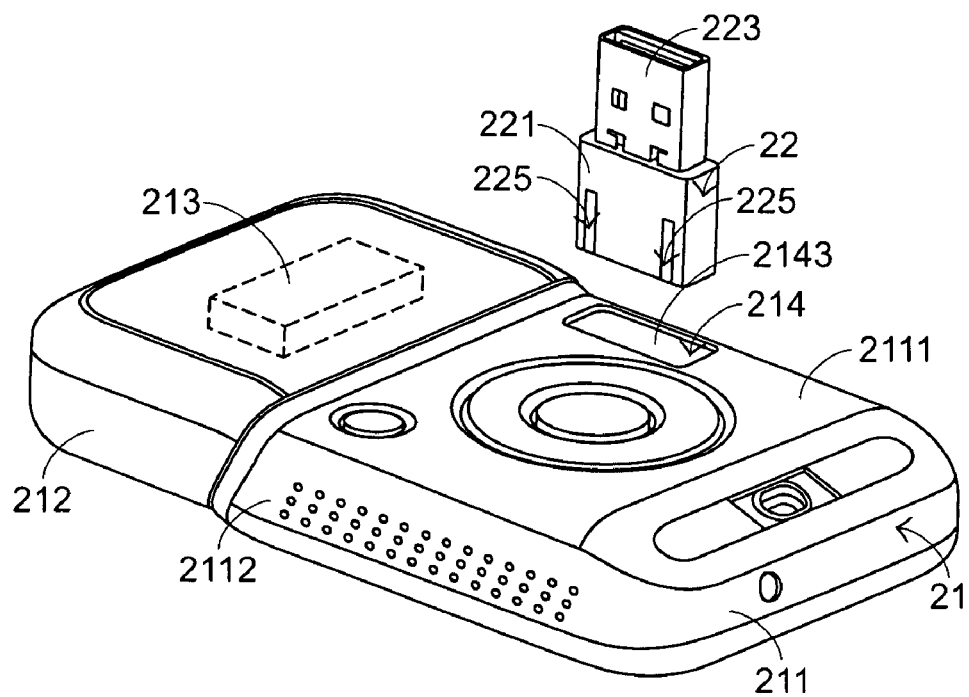
FIG. 3 is a schematic perspective view illustrating an exemplary chargeable wireless mouse of the present invention.

FIG. 3 is a schematic perspective view illustrating an exemplary chargeable wireless mouse of the present invention. In this embodiment, the wireless mouse 21 is a chargeable and shape-changeable mouse. As shown in FIG. 3, the wireless mouse 21 includes a first mouse body 211, a second mouse body 212 and a charging slot 214. The first mouse body 211 includes a first surface 2111 and a second surface 2112. The area of the first surface 2111 is greater than that of the second surface 2112. In this embodiment, the first surface 2111 is a bottom surface of the wireless mouse 21. The second surface 2112 is a sidewall surface of the wireless mouse 21. In addition, a charging slot cover 2143 is formed on the first surface 2111 of the first mouse body 211 for sheltering the charging slot 214 under the charging slot cover 2143 (see FIG. 5). When the charging slot cover 2143 is opened, the charging slot 214 is exposed. In addition, a chargeable battery 213 is mounted within the second mouse body 212 for providing electricity required for operating the wireless mouse 21. The chargeable battery 213 can be charged and reused. The wireless signal receiver 22 includes a holding part 221 and a USB connecting part 223. The holding part 221 can be held by the user. The USB connecting part 223 is disposed at a first end of the holding part 221 to be inserted into the USB connecting port 201 of the computer host 20.

Figure 4:
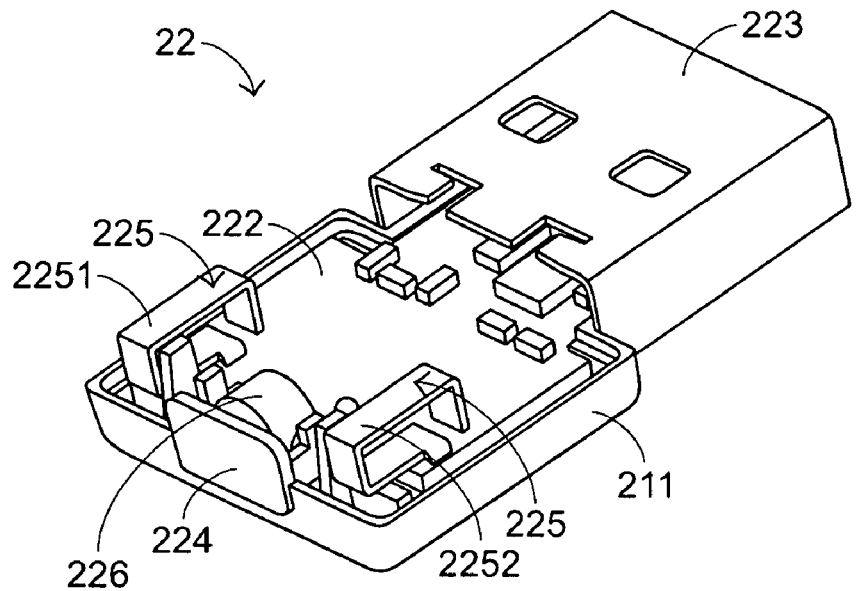
FIG. 4 is a schematic perspective view illustrating an exemplary wireless signal receiver of the chargeable wireless mouse of the present invention.
Figure 5:
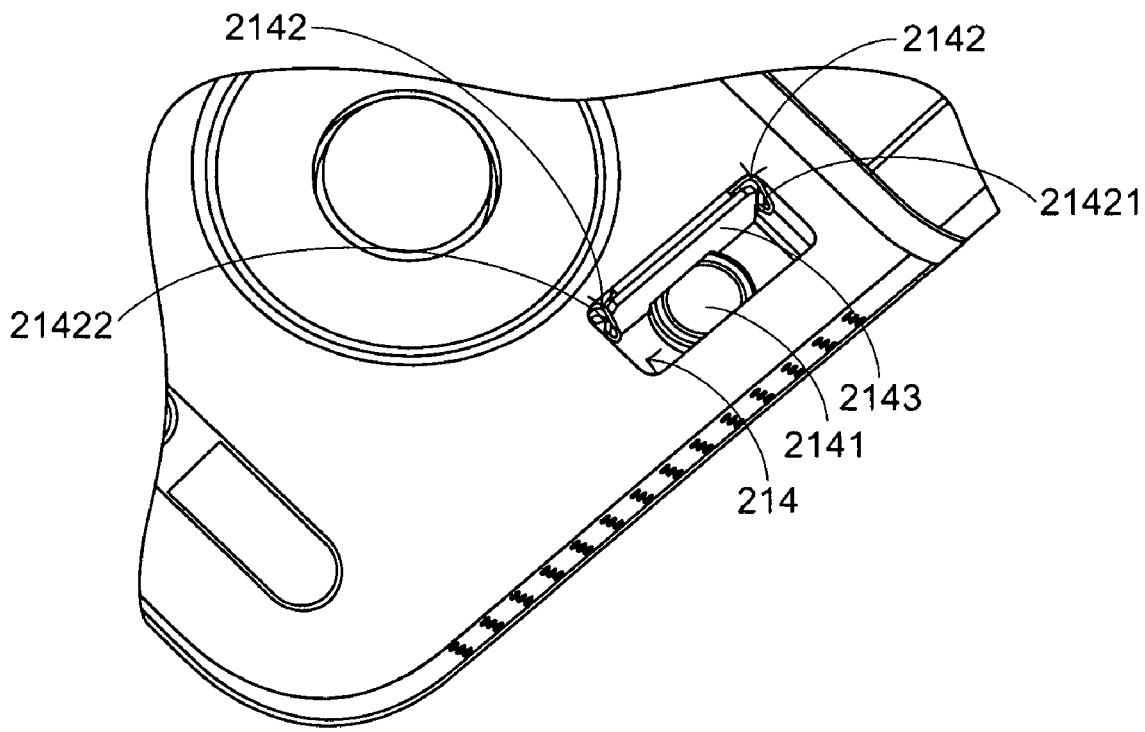
FIG. 5 is a schematic perspective view illustrating an exemplary charging slot of the chargeable wireless mouse of the present invention.

Hereinafter, the inner portion of the wireless signal receiver 22 will be illustrated with reference to FIG. 4. FIG. 4 is a schematic perspective view illustrating an exemplary wireless signal receiver of the chargeable wireless mouse of the present invention. The inner portion of the wireless signal receiver 22 includes a receiver circuit board 222, a metallic plate 224 and a charging plate member 225. The receiver circuit board 222 is disposed within the holding part 221. The metallic plate 224 is arranged at a second end of the holding part 221, wherein the second end is opposed to the first end. Moreover, a second magnetic element 226 is disposed on the metallic plate 224 for facilitating the metallic plate 224 to be magnetically attracted by a first magnetic element 2141 (as shown in FIG. 5). An example of the second magnetic element 226 is a magnet. The charging plate member 225 is disposed on the receiver circuit board 222 and exposed outside the holding part 221 (as shown in FIG. 3). The charging plate member 225 includes a positive electrode charging plate 2251 and a negative electrode charging plate 2252.

Figure 7:
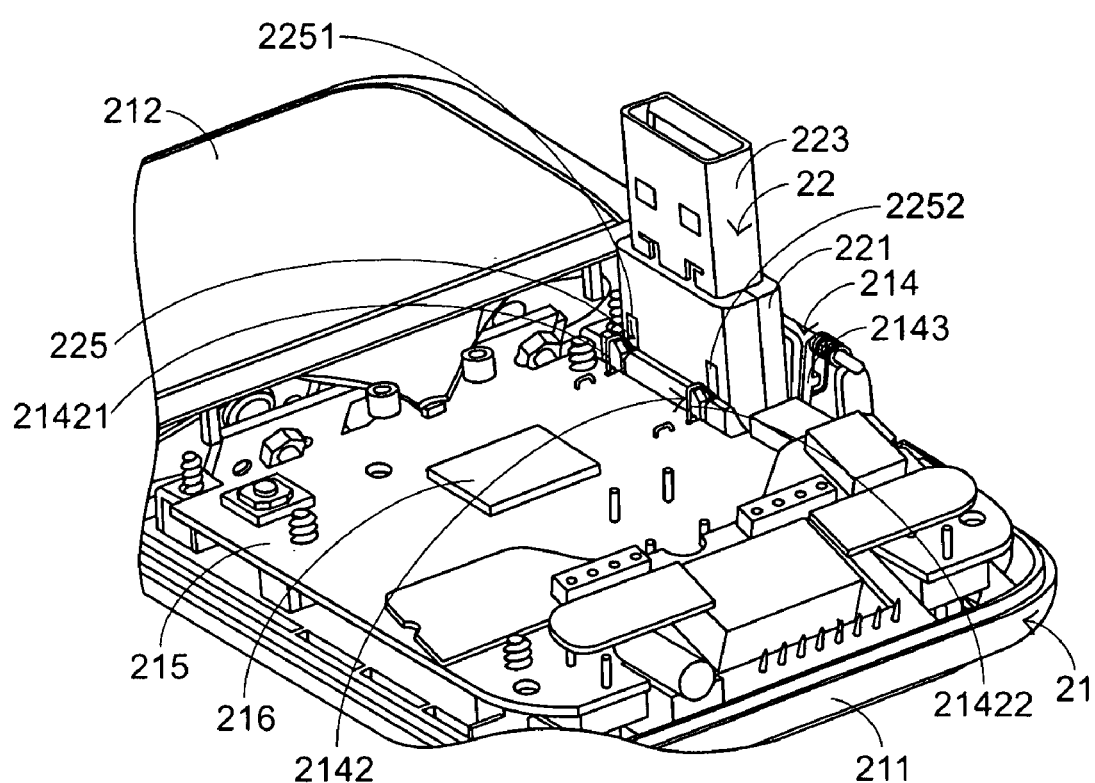
FIG. 7 is a schematic perspective view illustrating the inner portion of the chargeable wireless mouse in a charging mode.

Hereinafter, the inner portion of the charging slot 214 will be illustrated with reference to FIG. 5. FIG. 5 is a schematic perspective view illustrating an exemplary charging slot of the chargeable wireless mouse of the present invention. As shown in FIG. 5, when the charging slot cover 2143 is opened, the charging slot 214 is exposed to the first surface 2111 of the first mouse body 211. A first magnetic element 2141 and a conducting member 2142 are disposed within the charging slot 214. The first magnetic element 2141 can provide a magnetic force for attracting the metallic plate 224. An example of the first magnetic element 2141 is a magnet. The conducting member 2142 (e.g. a charger spring) is connected to a main circuit board 215 (as shown in FIG. 7) for transmitting electricity. The conducting member 2142 includes a positive electrode conducting part 21421 and a negative electrode conducting part 21422.

Figure 6:
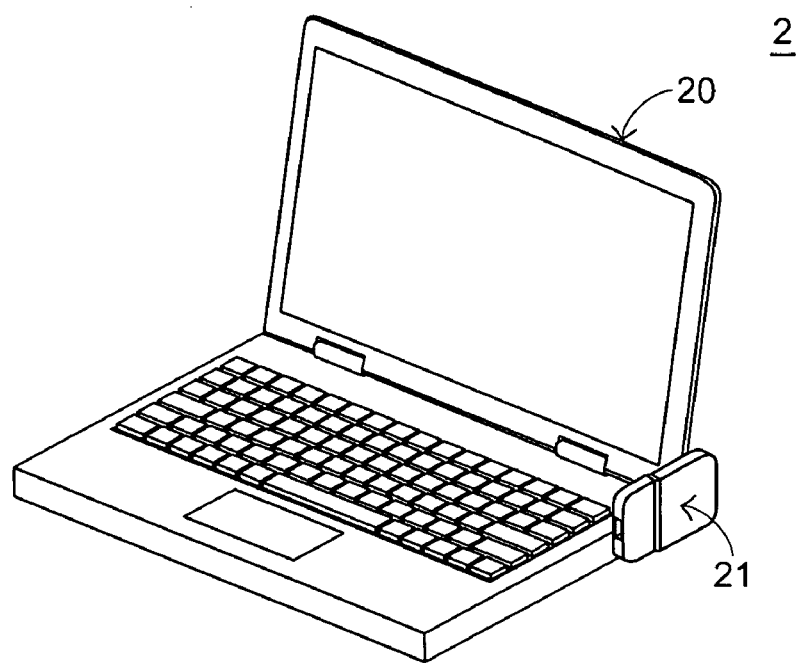
FIG. 6 is a schematic perspective view illustrating the chargeable wireless mouse of the present invention attached on a computer host to be charged by the computer system.

For using the wireless mouse 21 to operate the computer host 20, the USB connecting part 223 of the wireless signal receiver 22 needs to be inserted into the USB connecting port 201 of the computer host 20, so that electricity is transmitted from the computer host 20 to the wireless signal receiver 22 through the USB connecting part 223. After the electricity is transmitted to the receiver circuit board 222 within the wireless signal receiver 22, the wireless signal receiver 22 is enabled. For charging the wireless mouse 21, the charging slot 214 of the wireless mouse 21 is aligned with the wireless signal receiver 22 so as to accommodate the wireless signal receiver 22 within the charging slot 214. Meanwhile, the wireless mouse 21 is attached on the computer host 20, as can be seen in FIG. 6.

FIG. 7 is a schematic perspective view illustrating the inner portion of the chargeable wireless mouse in a charging mode. As shown in FIG. 7, a main circuit board 215 is disposed within the first mouse body 211 of the wireless mouse 21. The main circuit board 215 has a charging circuit 216 for controlling electricity transmission. After the wireless signal receiver 22 is inserted into the charging slot 214, the charging slot cover 2143 is propped open by the holding part 221 of the wireless signal receiver 22, and the metallic plate 224 at the second end of the wireless signal receiver 22 is contacted with the first magnetic element 2141 that is disposed within the charging slot 214. In addition, since the first magnetic element 2141, the second magnetic element 226 and the metallic plate 224 are attracted with each other, the wireless signal receiver 22 is firmly fixed in the charging slot 214 while the wireless signal receiver 22 is vertically protruded outside of the first surface 2111 of the wireless mouse 21.

Moreover, when the wireless signal receiver 22 is inserted into the charging slot 214 and the metallic plate 224 is contacted with the first magnetic element 2141, the charging plate member 225 of the wireless signal receiver 22 is contacted with the conducting member 2142, so that electricity is transmitted from the computer host 20 to the chargeable battery 213 of the wireless mouse 21 through the wireless signal receiver 22. In the charging slot 214, the positive electrode conducting part 21421 and the negative electrode conducting part 21422 of the conducting member 2142 are respectively contacted with the positive electrode charging plate 2251 and the negative electrode charging plate 2252 of the charging plate member 225. As such, the electricity of the computer host 20 is transmitted to the wireless signal receiver 22 through the USB connecting port 201, then transmitted from the receiver circuit board 222 to the charging plate member 225 and the conducting member 2142, then transmitted from the conducting member 2142 to the main circuit board 215, and finally transmitted from the main circuit board 215 to the chargeable battery 213 that is disposed within the second mouse body 212. The mechanism of transmitting the electricity is controlled by the charging circuit 216 of the main circuit board 215.

Figure 1:
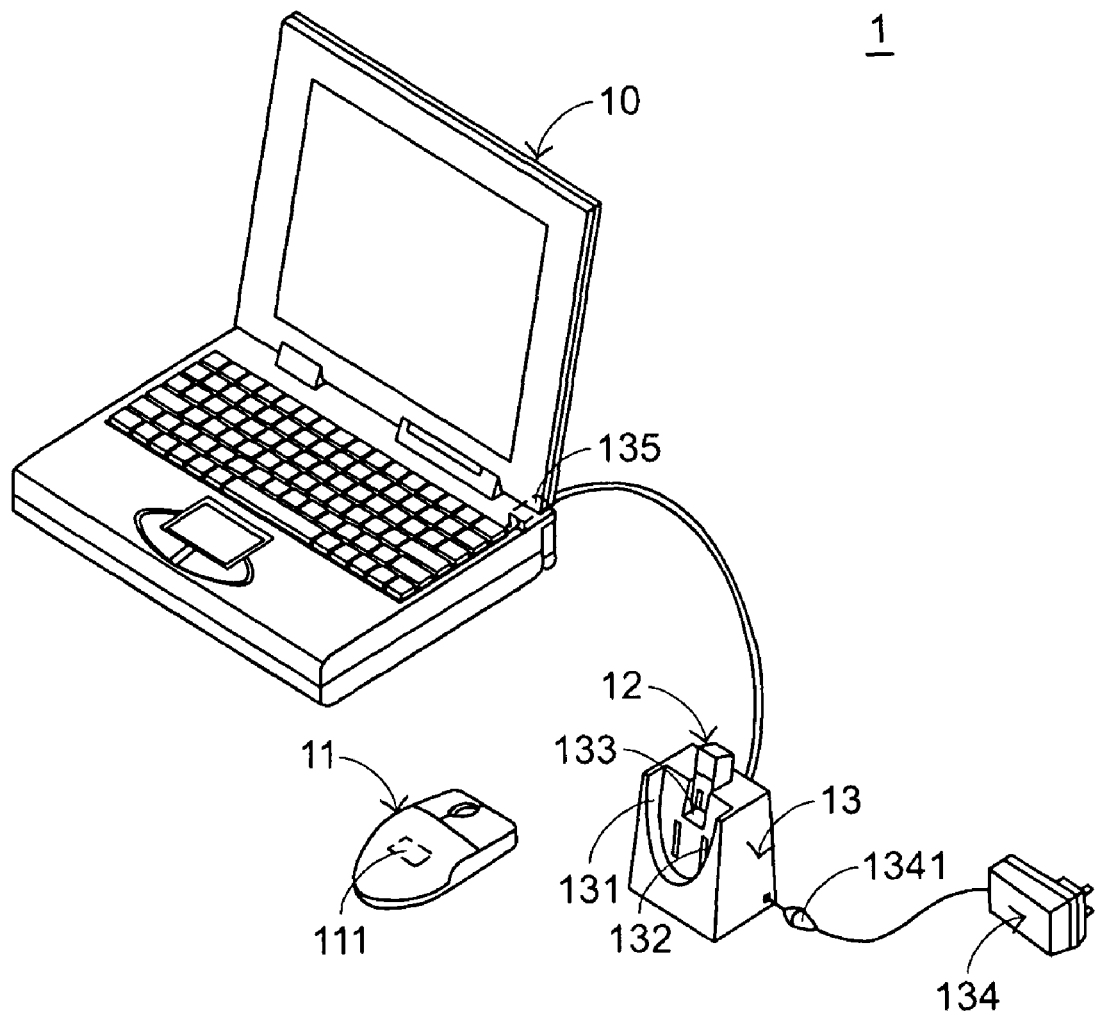
FIG. 1 is a schematic perspective view illustrating a computer system having a function of charging a wireless mouse according to the prior art.

In the above embodiments, the wireless mouse of the present invention has a charging slot, and a first magnetic element and a conducting member are disposed within the charging slot. When the USB connecting part of the wireless signal receiver is inserted into the USB connecting port of the computer host and the holding part of the wireless signal receiver is inserted into the charging slot, the conducting member is contacted with the wireless signal receiver so as to charge the wireless mouse. In other words, the wireless mouse can be directly charged by the computer system without the need of carrying an additional wireless mouse charger as shown in FIG. 1. Moreover, since the metallic plate of the wireless signal receiver is magnetically attracted by the first magnetic element that is disposed within the charging slot, the wireless signal receiver can be firmly fixed in the charging slot and the wireless signal receiver is securely connected with the computer host. Moreover, the user may simultaneously carry the computer host and the wireless mouse as long as the wireless mouse is connected with the computer host. When the wireless signal receiver is inserted into the charging slot that is formed in the first surface of the wireless mouse, the wireless signal receiver is substantially perpendicular to the first surface and thus the wireless mouse is upright (as shown in FIG. 6). According to the mechanical principle, the torque to rotate the upright wireless mouse about the computer host is the minimum because the width of the second surface of the wireless mouse is very short. In other words, a relatively stronger force exerted on the wireless mouse in the downward or upward direction (e.g. in the direction perpendicular to the second surface of the wireless mouse) is sufficient to rotate the wireless mouse. When the upright wireless mouse is connected with the computer host, the possibility of detaching the wireless mouse from the USB connecting port of the computer host is minimized.

From the above description, the chargeable wireless mouse of the present invention can be directly charged by the computer system without the need of carrying an additional wireless mouse charger. In addition, the mouse body is firmly connected with the wireless signal receiver when the wireless mouse is operating in the charging mode. In comparison with the prior art, the wireless mouse of the present invention is more user-friendly. The present invention is illustrated by referring a shape-changeable and chargeable wireless mouse. Nevertheless, the present invention may be applied to other wireless mouse as long as the area of the first surface is greater than that of the second surface. For example, the wireless mouse can be a slim-type wireless mouse.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A chargeable wireless mouse comprising:
    a mouse body having a first surface and a second surface, wherein said first surface and said second surface are perpendicular to each other, and the area of said first surface is greater than that of said second surface;
    a main circuit board disposed within said mouse body;

a chargeable battery disposed within said mouse body and connected to said main circuit board for storing electric energy;

a charging slot formed in said first surface, wherein a first magnetic element and a conducting member are disposed within said charging slot, and said conducting member is connected to said main circuit board; and a wireless signal receiver connected to a universal serial bus (USB) connecting port of a computer host for receiving a wireless signal emitted by said wireless mouse, said wireless signal receiver comprising:

a holding part;

a receiver circuit board disposed within said holding part;

a USB connecting part disposed at a first end of said holding part to be connected with said USB connecting port of said computer host, wherein electricity of said computer host is transmitted to said receiver circuit board through said USB connecting part;

a metallic plate disposed at a second end of said holding part; and a charging plate member mounted on said receiver circuit board and exposed outside said holding part, wherein when said wireless signal receiver is accommodated within said charging slot and said USB connecting part of said wireless signal receiver is connected with said USB connecting port of said computer host, said wireless signal receiver is contacted with said conducting member such that electricity is transmitted from said receiver circuit board to said chargeable battery, said metallic plate is contacted with and magnetically attracted by said first magnetic element such that said wireless signal receiver is fixed in said charging slot, and said wireless signal receiver generally extends outwardly away from said first surface in a direction perpendicular to said first surface of said mouse body.

2. The chargeable wireless mouse according to claim 1 wherein said first surface is a bottom surface of said wireless mouse and said second surface is a sidewall surface of said wireless mouse.

3. The chargeable wireless mouse according to claim 1 wherein said main circuit board has a charging circuit for controlling transmission of said electricity from said main circuit board to said chargeable battery.

4. The chargeable wireless mouse according to claim 1 wherein said wireless signal receiver further includes a second magnetic element, which is disposed on said metallic plate, for facilitating said metallic plate to be magnetically attracted by said first magnetic element.

5. The chargeable wireless mouse according to claim 4 wherein said first magnetic element and said second magnetic element are magnets.

6. The chargeable wireless mouse according to claim 1 wherein said conducting member includes a positive electrode conducting part and a negative electrode conducting part, and said charging plate member includes a positive electrode charging plate and a negative electrode charging plate, wherein when said wireless signal receiver is inserted into said charging slot, said positive electrode conducting part and said negative electrode conducting part are respectively contacted with said positive electrode charging plate and a negative electrode charging plate so as to transmit electricity.

7. The chargeable wireless mouse according to claim 1 wherein said mouse body further includes a charging slot cover for sheltering said charging slot, and said charging slot is exposed when said charging slot cover is opened.

8. The chargeable wireless mouse according to claim 1 wherein said conducting member is a charger spring.

9. The chargeable wireless mouse according to claim 1 wherein a receiver storing part is further formed in said mouse body for storing said wireless signal receiver.

10. The chargeable wireless mouse according to claim 1 wherein said chargeable wireless mouse is a slim-type wireless mouse.

11. The chargeable wireless mouse according to claim 1 wherein said chargeable wireless mouse is a shape-changeable mouse.

* * * * *